United States Patent Office 3,177,068
Patented Apr. 6, 1965

3,177,068
RECOVERY OF BERYLLIUM FROM
BERTRANDITE ORE
William A. Mod, Lake Jackson, and Charles W. Becker, Angleton, Tex., assignors to The Dow Chemical Company, Midland, Mich., a corporation of Delaware
No Drawing. Filed Feb. 6, 1963, Ser. No. 256,508
8 Claims. (Cl. 75—101)

This invention relates to a process for the recovery of beryllium values from a fluoride ore containing bertrandite.

This application is a continuation-in-part of our copending application Serial Number 854,570, filed November 23, 1959, now abandoned.

Beryllium has been recovered heretofore from ores containing relatively high proportions of beryllium. The most common ore presently used as a source of beryllium is beryl. Recovery of beryllium from beryl, which is a beryllium aluminum silicate, is a difficult, and relatively expensive, process. Usual methods of recovering beryllium from beryl include the steps of heating the ore to a temperature of around 1600 degrees centigrade, quenching the heated ore to shatter it, and subsequently reacting the ore at temperatures around 200–300 degrees centigrade with a strong mineral acid such as sulfuric acid, thereby dissolving beryllium values for further recovery. In other processes, beryl may be heated to high temperatures, as by an electric arc furnace, with a suitable fluxing material, and then treated with aqueous material to dissolve beryllium values.

Bertrandite, a beryllium oxide-silicon dioxide ore, is most commonly found widely dispersed in small amounts in fluoride ores such as fluorspar or calcium fluoride. Some fluorspar or calcium fluoride deposits may contain as little as 0.05 weight percent beryllium in the form of bertrandite, while some unusually rich deposits may contain as much as 1.5 weight percent beryllium in the form of bertrandite.

The difficult, relatively expensive methods ordinarily used to recover beryllium, as from beryl, are not economically feasible with low assay ores such as the bertrandite-containing fluoride ores.

It is an object of this invention to provide a simple, relatively inexpensive process whereby beryllium values may be recovered from bertrandite-containing fluoride ores.

Other objects and advantages of the present invention will become apparent in the course of the following specification.

The objects of the present invention may be accomplished by treating finely divided bertrandite-containing fluoride ores with a strong mineral acid, such as hydrochloric, hydrobromic, sulfuric, nitric, and phosphoric acids, at a temperature maintained at from about 70 to about 120 degrees centigrade, preferably at from about 100 to about 110 degrees centigrade. Acid treatment at the above temperatures converts the beryllium contained in the ore to a soluble salt. The solution, containing beryllium, is separated from the undissolved solids and known methods, such as precipitation of beryllium hydroxide as suggested in Rarer Metals, De Ment and Dake, Chemical Publishing Co., Inc., Brooklyn, N.Y. (1946), at page 4, or by the method described in U.S. Patent 3,059,998, may then be employed to recover beryllium from the solution.

No high temperature pretreatment is required in the present process.

Treatment of the ore with acid at temperatures of less than about 70 degrees centigrade is generally undesirable because of the excessive time required to accomplish extraction of a reasonable amount of beryllium from the ore. At temperatures above about 120 degrees centigrade, fairly rapid leaching may be accomplished, but the capital and operating costs of elevated pressure equipment, necessary at such temperatures to prevent substantial acid evaporation, is generally prohibitive. Further, at temperatures above about 120 degrees centigrade, substantial dissolution of other extraneous matter found in the ore tends to make recovery of beryllium from the solution more difficult. Optimum results are usually obtained at a temperature of from about 100 to about 110 degrees centigrade because of relatively low equipment and operational costs coupled with relatively short (1–3 hours) treatment time.

Treatment of the ore of the present invention may be carried out in a variety of ways. Simple mixing of acid with the fluoride ore in a batch method will give satisfactory results. Continuous or counter-current contact means may be employed for the acid treatment step, if desired.

As in most solid-liquid contact leaching operations, contact time is largely dependent on ore particle size. Thus, using dilute acid and relatively coarse particle size, the requisite contact time necessary for recovery of a significant proportion of the beryllium in the ore may be considerable.

Using a relatively concentrated acid solution and an ore particle size of 100 Tyler mesh or less, a leaching time of from about one to about five hours is usually appropriate except when phosphoric acid is employed, when a slightly longer time is usually desirable. Ordinarily, under these conditions, as much as 95 percent of the beryllium contained in the ore may be extracted. When dilute acid solutions are used to treat ore having a coarser particle size, more contact time is usually required for a comparable beryllium recovery.

Treatment of ore particles having about ¼ inch diameter with an acid solution containing as little as about five weight percent acid may be accomplished, but contact time must usually be increased to from about 24 to about 36 hours in order to get reasonable recovery of beryllium from the ore.

Acid solutions containing from about 20 to about 60 weight percent acid are usually suitable for use in the present invention except when hydrochloric acid is used. Generally, a hydrochloric acid concentration of from about 10 to about 30 weight percent acid is suitable, while a solution containing from about 15 to about 25 weight percent of hydrochloric acid is preferred.

Bertrandite-containing fluoride ores to be treated by the process of the present invention ordinarily contain materials which will react with acid used in treatment. Thus, although a stoichiometric amount of acid required to react with the beryllium is operable, an excess of acid is to be preferred. Depending somewhat on the reactive materials contained in the ore, as much as four or five times the stoichiometric amount of acid may be necessary for substantially complete extraction of beryllium from the ore.

Greater efficiency and less acid consumption may be obtained, when readily soluble materials such as calcium carbonate are present, by a pre-leach with dilute acid, especially in situations where dilute (up to about 5 weight percent) acid solutions are readily available as waste or by-products from other processes. By means of a pre-leach, readily soluble materials are removed prior to the beryllium extraction leaching, thus requiring less of the more expensive concentrated acid and increasing the efficiency of beryllium recovery.

A better understanding of the present invention may be obtained in light of the following examples which are set forth to illustrate, and are not to be construed to limit, the present invention.

EXAMPLE I

A fluorspar ore having approximately 97 weight percent of calcium fluoride and about 0.09 weight percent of beryllium as bertrandite was finely ground so that all of the particles passed through a 150 mesh Tyler standard mesh screen.

To a flask, 50 grams of the ore and 50 milliliters of 20 weight percent hydrochloric acid were added. The contents of the flask were agitated and heated to a temperature of 180° C. for about 3 hours after which the slurry thereby produced was filtered, the residue washed with water, and dried. The filtrate and residue were analyzed for beryllium. It was found that 95 percent of the beryllium in the ore had been extracted from the ore.

Comparative I

A mixture of 10.46 grams of solid calcium fluoride and 2.00 grams of solid beryl was ground to a size that all particles passed through a 150 mesh Tyler standard mesh screen. Thus, the ore in Example I above was approximated except with beryl substituted for bertrandite.

The mixture was treated with 48.8 grams of 20 weight percent hydrochloric acid for 3 hours at 108 degrees centigrade. Filtration, washing and drying were carried out as in Example I. Upon analysis, it was found that only 6.0 percent of the beryllium in the beryl-calcium fluoride mixture was extracted.

EXAMPLE II

A fluorspar ore was used which had an analysis similar to that shown in Example I with the exception that its beryllium content was about 0.2 weight percent. To a flask, 1,000 grams of the ore and 573 milliliters of 50 weight percent sulfuric acid were added. The resulting slurry obtained in the flask was heated to 105° C. and maintained at that temperature for 1 hour. After the 1 hour, the slurry was filtered and the residue washed with water and dried. Upon analysis of the filtrate and the dry residue, it was found that 89 percent of the beryllium had been extracted by the sulfuric acid.

To illustrate the effect of acid concentration upon the rate of recovery, another run was made employing ore having substantially the same composition as above. A 20 weight percent sulfuric acid solution was used and the ore was contacted with the acid for 3 hours at 105° C. Upon analysis of the filtrate and the dry residue, it was found that 80 percent of the beryllium had been extracted.

Comparative II

A comparative synthetic ore mixture was prepared as in Comparative I by mixing and grinding 2.00 grams of beryl with 10.46 grams of calcium fluoride.

The mixture was treated with 65.8 grams of 20 weight percent sulfuric acid for 3 hours at a temperature of 105 degrees centigrade. After filtering, washing, and drying, as above, analysis disclosed that only 3.0 percent of the beryllium in the synthetic ore mixture had been extracted.

EXAMPLE III

A 25 gram fluorspar sample having an analysis similar to that shown in Example I except that the beryllium content was 0.22 weight percent, was digested with 8 milliliters of 20 weight percent phosphoric acid for 3 hours at 102° C. in a manner similar to that described above. Upon analysis of the filtrate and the dry residue, it was found that 26 percent of the beryllium had been extracted. Additional digestion time substantially increases the amount of beryllium extracted.

EXAMPLE IV

In a manner similar to that described in Example III, 25 grams of the fluorspar ore used in Example III were digested with 15.4 milliliters of 20 weight percent nitric acid for 3 hours at 105° C. Upon analysis of the filtrate and the dry residue, it was found that 88 percent of the beryllium had been extracted.

EXAMPLE V

A sample of 25 grams of a finely ground fluorspar ore (−150 mesh Tyler standard screen) having the following analysis in weight percent was leached with 83.6 grams of a 20 weight percent hydrochloric acid solution:

|  | Weight percent |
|---|---|
| $CaF_2$ | 48.3 |
| $CaCO_3$ | 26.6 |
| $SiO_2$ | 10.8 |
| $R_2O_3$ | 7.8 |

The beryllium content of the sample in form of bertrandite was 0.9 weight percent. The sample was digested in the hydrochloric acid for 3 hours at a temperature of 108° C. Upon analysis of the filtrate and residue, it was found that 92 percent of the beryllium was extracted from the ore.

In a manner similar to that of the foregoing examples, hydrobromic acid may be substituted for the acids specifically shown.

Thus, it may be readily seen that the process of the present invention is well suited for the extraction of beryllium values from bertrandite-containing fluoride ores. Mild temperatures and relatively simple equipment may be used which would be entirely unsuitable for recovery of beryllium values from the previously known ores such as beryl.

Various modifications may be made in the present invention without departing from the spirit or scope thereof, and it is to be understood that we limit ourselves only as defined in the appended claims.

We claim:

1. A process for the recovery of beryllium values from fluoride ore which contains bertrandite ore comprising mixing the ore with an aqueous solution of a strong mineral acid selected from the group consisting of hydrochloric, hydrobromic, sulfuric, nitric, and phosphoric acids, at a temperature of from about 70 to about 120 degrees centigrade, thereby converting the beryllium in the ore to a soluble salt and dissolving the beryllium salt in the acid solution, and recovering the beryllium values from the acid solution.

2. A process for the recovery of beryllium values from fluoride ore which contains bertrandite ore comprising mixing the ore with an aqueous solution of a strong mineral acid selected from the group consisting of hydrochloric, hydrobromic, sulfuric, nitric, and phosphoric acids, at a temperature of from about 100 to about 110 degrees centigrade, thereby converting the beryllium in the ore to a soluble salt and dissolving the beryllium salt in the acid solution, and recovering the beryllium values from the acid solution.

3. A process for the recovery of beryllium values from fluoride ore which contains bertrandite ore comprising mixing the ore with an aqueous solution containing from about 10 to about 30 weight percent hydrochloric acid at a temperature of from about 70 to about 120 degrees centigrade, thereby converting the beryllium in the ore to a soluble salt and dissolving the beryllium salt in the acid solution, and recovering the beryllium values from the acid solution.

4. A process for the recovery of beryllium values from fluoride ore which contains bertrandite ore comprising mixing the ore with an aqueous solution containing from about 15 to about 25 weight percent hydrochloric acid at a temperature of from about 70 to about 120 degrees centigrade, thereby converting the beryllium in the ore to a soluble salt and dissolving the beryllium salt in the acid solution, and recovering the beryllium values from the acid solution.

5. A process for the recovery of beryllium values from fluoride ore which contains bertrandite ore comprising mixing the ore with an aqueous solution containing from about 20 to about 60 weight percent sulfuric acid at a temperature of from about 70 to about 120 degrees centigrade, thereby converting the beryllium in the ore to a soluble salt and dissolving the beryllium salt in the acid solution, and recovering the beryllium values from the acid solution.

6. A process for the recovery of beryllium values from fluoride ore which contains bertrandite ore comprising mixing the ore with an aqueous solution containing from about 20 to about 60 weight percent nitric acid at a temperature of from about 70 to about 120 degrees centigrade, thereby converting the beryllium in the ore to a soluble salt and dissolving the beryllium salt in the acid solution, and recovering the beryllium values from the acid solution.

7. A process for the recovery of beryllium values from fluoride ore which contains bertrandite ore comprising mixing the ore with an aqueous solution containing from about 20 to about 60 weight percent phosphoric acid at a temperature of from about 70 to about 120 degrees centigrade, thereby converting the beryllium in the ore to a soluble salt and dissolving the beryllium salt in the acid solution, and recovering the beryllium values from the acid solution.

8. A process for the recovery of beryllium values from fluorspar ore containing from 0.05 to 1.5 weight percent bertrandite which comprises, reducing the particle size of said ore to about 100 Tyler mesh size, mixing the ore particles with an aqueous solution of a strong mineral acid selected from the group consisting of hydrochloric, hydrobromic, sulfuric, nitric, and phosphoric acids, at a temperature of from about 70 to about 120 degrees centigrade, thereby converting the beryllium in the ore to a soluble salt and dissolving the beryllium salt in the acid solution, and recovering the beryllium values from the acid solution.

References Cited by the Examiner

Mellor: Comprehensive Treatise on Inorganic and Theoretical Chemistry, vol. IV, Longmans, Green and Company, New York, New York (1923), pages 207–209.

Rarer Metals, De Ment and Dake, Chemical Publishing Company, Inc., Brooklyn, New York (1946), pages 14 and 15.

BENJAMIN HENKIN, *Primary Examiner.*

DAVID L. RECK, *Examiner.*